United States Patent [19]
Duault et al.

[11] Patent Number: 5,996,018
[45] Date of Patent: Nov. 30, 1999

[54] METHOD AND APPARATUS TO REDUCE JITTER AND END-TO-END DELAY FOR MULTIMEDIA DATA SIGNALLING

[75] Inventors: Maurice Duault, Saint-Laurent-Du-Var; Claude Galand, Cagnes-Sur-Mer; Francois Kermarec, Cagnes Sur Mer; Bernard Pucci, Cagnes Sur Mer, all of France

[73] Assignee: International Business Machines Corporation, Armonk, N.Y.

[21] Appl. No.: 08/758,071

[22] Filed: Nov. 27, 1996

[30] Foreign Application Priority Data

Dec. 6, 1995 [EP] European Pat. Off. .............. 95480173

[51] Int. Cl.⁶ ..................................................... G06F 13/42
[52] U.S. Cl. .............................. 709/234; 710/52; 370/516
[58] Field of Search ..................................... 395/821, 824, 395/827, 200.64, 200.65, 200.61, 200.76, 200.63, 872, 873, 874, 875, 876, 877; 370/516, 517, 518, 519; 709/234, 235, 231, 233, 246; 710/1, 4, 7, 52, 53, 54, 55, 56, 57

[56] References Cited

U.S. PATENT DOCUMENTS

| | | | |
|---|---|---|---|
| 4,099,028 | 7/1978 | Towson, IV | 370/479 |
| 4,270,183 | 5/1981 | Robinson et al. | 364/900 |
| 4,748,620 | 5/1988 | Adelmann et al. | 370/94 |
| 5,043,981 | 8/1991 | Firoozmand et al. | 370/85.1 |
| 5,140,584 | 8/1992 | Suzuki | 370/60 |
| 5,164,939 | 11/1992 | Shobatake | 370/60 |
| 5,278,825 | 1/1994 | Wallmeier et al. | 370/60 |
| 5,287,347 | 2/1994 | Spanke | 370/60 |
| 5,361,261 | 11/1994 | Edem et al. | 370/85.3 |
| 5,425,060 | 6/1995 | Roberts et al. | 375/371 |
| 5,497,371 | 3/1996 | Ellis et al. | 370/60 |
| 5,519,603 | 5/1996 | Allbery, Jr. et al. | 364/133 |
| 5,546,389 | 8/1996 | Wippenbeck et al. | 370/60 |
| 5,555,264 | 9/1996 | Sallberg et al. | 370/17 |
| 5,563,884 | 10/1996 | Fimoff et al. | 370/84 |
| 5,594,734 | 1/1997 | Worsley et al. | 370/395 |
| 5,619,506 | 4/1997 | Burch et al. | 370/506 |
| 5,664,116 | 9/1997 | Gaytan et al. | 395/200.64 |
| 5,668,811 | 9/1997 | Worsley et al. | 370/424 |
| 5,675,584 | 10/1997 | Jeong | 370/284 |
| 5,732,087 | 3/1998 | Lauer et al. | 370/416 |
| 5,790,543 | 8/1998 | Cloutier | 370/395 |
| 5,856,975 | 1/1999 | Rostoker et al. | 370/395 |
| 5,862,136 | 1/1999 | Irwin | 370/395 |

FOREIGN PATENT DOCUMENTS

| | | |
|---|---|---|
| 0224626 | 10/1985 | European Pat. Off. . |
| 0632625 | 6/1993 | European Pat. Off. . |
| 0599657 | 11/1993 | European Pat. Off. . |
| 9514337 | 5/1995 | WIPO . |

OTHER PUBLICATIONS

"Constant Bit Rate Services in ATM Networks," NEC Research & Development, 32(1991) Jul., No. 3, Tokyo, JP, by T. Murase, H. Suzuki & T. Takeuchi.

Veil, Len; Wong, Dickson; "Tricky road from legacy LAN to ATM", Electronic Engineering Times, Sep. 18, 1995, n866, p55(1).

Sliter, Tom; "From mainframe to mainstream: SNA integration", STACKS, Miller Freeman Inc., Jan. 1995, v3, n1, p33(9).

Primary Examiner—Mark H. Rinehart
Assistant Examiner—Marc D Thompson
Attorney, Agent, or Firm—Daniel E. McConnell

[57] ABSTRACT

A method and an apparatus for reducing the jitter and end-to-end delay on lines of a packet switching network conveying voice or video digitalized data for one or more connections between a local source and a remote source at a constant bit rate.

The method and apparatus of the invention are for use in a voice or video processor of a voice or video processing server of a network node; the method and the apparatus provide a way of controlling the remote traffic rate from the remote source before accessing the processor without using an external clocking such as the network clock.

The solution proposed by the invention consists in buffering the remote and local traffics to adapt the remote traffic rate to the local traffic rate, which is supposed having a limited jitter, while sequencing of the access of the buffered data to the processor.

9 Claims, 5 Drawing Sheets

PLURALITY OF CONNECTIONS

TIME DIVISION MULTIPLEXING

METHOD AND APPARATUS TO REDUCE JITTER AND END-TO-END DELAY FOR MULTIMEDIA DATA SIGNALLING

The invention relates to jitter and end-to-end delay in connections through packet networks transporting voice and/or video data; more particularly, the invention applies to a voice and/or video processing server in a communication network access node.

BACKGROUND OF THE INVENTION

Transmitting real-time traffic on full-duplex lines over packet networks is expected to play an important role in future telecommunications. Digital based devices are superseding their classical analogue counterparts in public switched network, increasing the demand for analogue-digital (A/D) conversion, data coding/decoding, echo cancellation and compression/decompression.

The devices involved are typically shared by several sources using time division multiplexing (TDM). Time domain multiplexing of data streams of several source requires exact synchronization of those sources to be performed efficiently.

In a full-duplex voice and/or video communication, need for synchronization is pronounced by having in almost every case a local source and a remote source which communicate. The local source defined as being physically close the data signal processing apparatus provides a signal with low latency or jitter and a constant bit-rate. The signal of the remote source while crossing the network is subject of end to end delay, and comparably large jitter. Depending on the quality of the intermediate network, connection parameters like cell delay variation or burst size can only be approximately guaranteed for the remote source.

An asynchronous process consists in receiving and processing the packets when they arrive in the input packet stream. This method is not a problem when the processor is not loaded. However, when signal processing requires to process the signal transmitted from the remote source and from the local source within the same time slot, synchronization measures to secure this simultaneous process are necessary. The synchronous process may consist in using a timer for re-synchronization: this method requires the access to an external clock such as the network clock. Usage of a timer is applied in the system described in the European Patent EP224626. In an telecommunications access node the port adapters, thanks to the network lines attachments, can re-synchronize the traffic using the clock of the network. However, in a processing server which is a part of the network node with no external network line attachment, it is not simple to retrieve the clock from another part of the node.

In view of the prior art, it is therefore an object of the current invention to provide a method and apparatus for synchronizing a remote and a local source of traffic to be Processed as to minimize overrun and underrun of the processor when there is a difference in the frequency of both sources without using an external clock. As many connections are established on the same lines, it is a further object of the invention to minimize delays when feeding signals of several pairs of local and remote sources (connections) to the shared signal processing device.

SUMMARY OF THE INVENTION

The above mentioned objects are achieved by a method for reducing the jitter on a video or voice signal on a line of a packet switching network said signal corresponding to one connection between a local and a remote constant bit rate source of the network; said method being used to feed up a processor in a telecommunication network node receiving a local packets traffic from said local source and a remote packets traffic from said remote source; said method comprising the steps of:

buffering n packets received from said local traffic in a local traffic buffer (254) up to a threshold T;

simultaneously buffering the packets received from the remote traffic in a remote traffic buffer (255);

when said threshold T is reached, reading the content of the local traffic buffer and dequeuing the 'first in' packet of the remote traffic buffer;

sending the content of the local traffic buffer plus the 'first in' packet of the remote traffic buffer to said processor.

In order to minimize delays for accessing the processor, the method applied to each new connection i established on said line after a first said connection being established among the maximum of M connections supported by said processor (i=2 to M) comprises, the following initial step:

assuming the size of said packets received from the local traffic is S, buffering dummy data during a time being the modulo T sum of the buffering time corresponding to the current data already buffered for the first connection established plus i−1 times the value S.

The advantage brought by the method of the invention or the apparatus implementing the method of the invention is, by controlling the remote traffic with the local traffic, to improve the end-to-end delay and jitter of each connection. The advantage brought by evenly spreading the processing delay and thus also reducing the jitter in the packets stream. With the solution of the invention a remote traffic with variable bit rate con be supported which is not the case with the method using a timer and a clock of the prior art. A consequence of such a synchronization is to avoid overrun and underrun for the local traffic and to avoid overrun of the remote traffic.

DETAILED DESCRIPTION OF THE INVENTION

Figure 1:
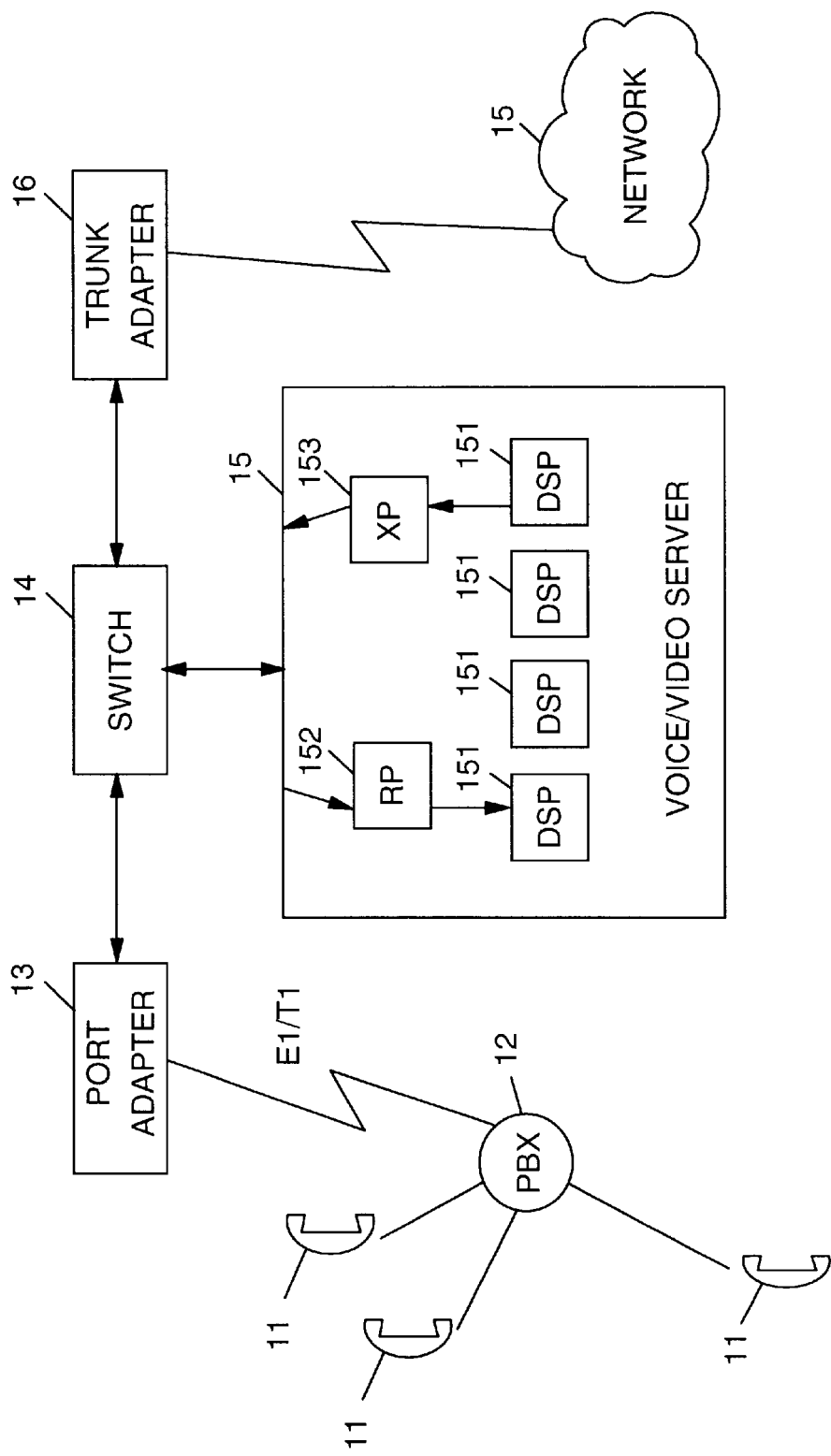
FIG. 1 given an overview of a communication network to which the invention is applied.

In the following the use of the invention in a voice communication network will be demonstrated. Such a network is schematically illustrated by FIG. 1. Up to 32 private lines 11 are concentrated at a PBX (Private Branch Exchange) station 12 into a standard E1/T1 line, which is created by time multiplexing of the digitized voice channels. Each voice channel is sampled at a rate of 8000 times per second (one sample every 125 µs) and each sample is represented by 8 bits, giving a constant bit rate of 64 kbit/s. The signal is then transmitted over a public network 17 via a switch 14. As most of the switches operate only on data having a specific format, appropriate port adapters 13, 16 are usually required at the PBX and the network side of the switch for converting the incoming and outgoing signals. In this example the switch is based on transmitting variable length data packets.

The invention is applied to a voice server 15 also attached to the switch 14. The voice server provides a signal transformation from the PCM (Pulse Code Modulation) format to the GSM (Group Special Mobile) standard signal. This transformation involves a signal compression by a factor of 5. The transformation or conversion is performed by a plurality of digital signal processors (DSP) which are connected to a receive processor (RP) 152 and a transmit processor (XP) 153. These processors manage the transfer of data from and to the DSPs 151. They are described in further details below.

It should be understood that the PCM-GSM and GSM-PCM conversions performed by the voice server 15 only represent one example to which the present invention can be applied. This conversion could be replaced by any other digital processing of remote source and local source data shared by several connection through TDM.

A voice connection includes two participants assumed to be separated by the network 17. (To have a complete view of one connection, one may mirror the elements of FIG. 1).

Figure 2:
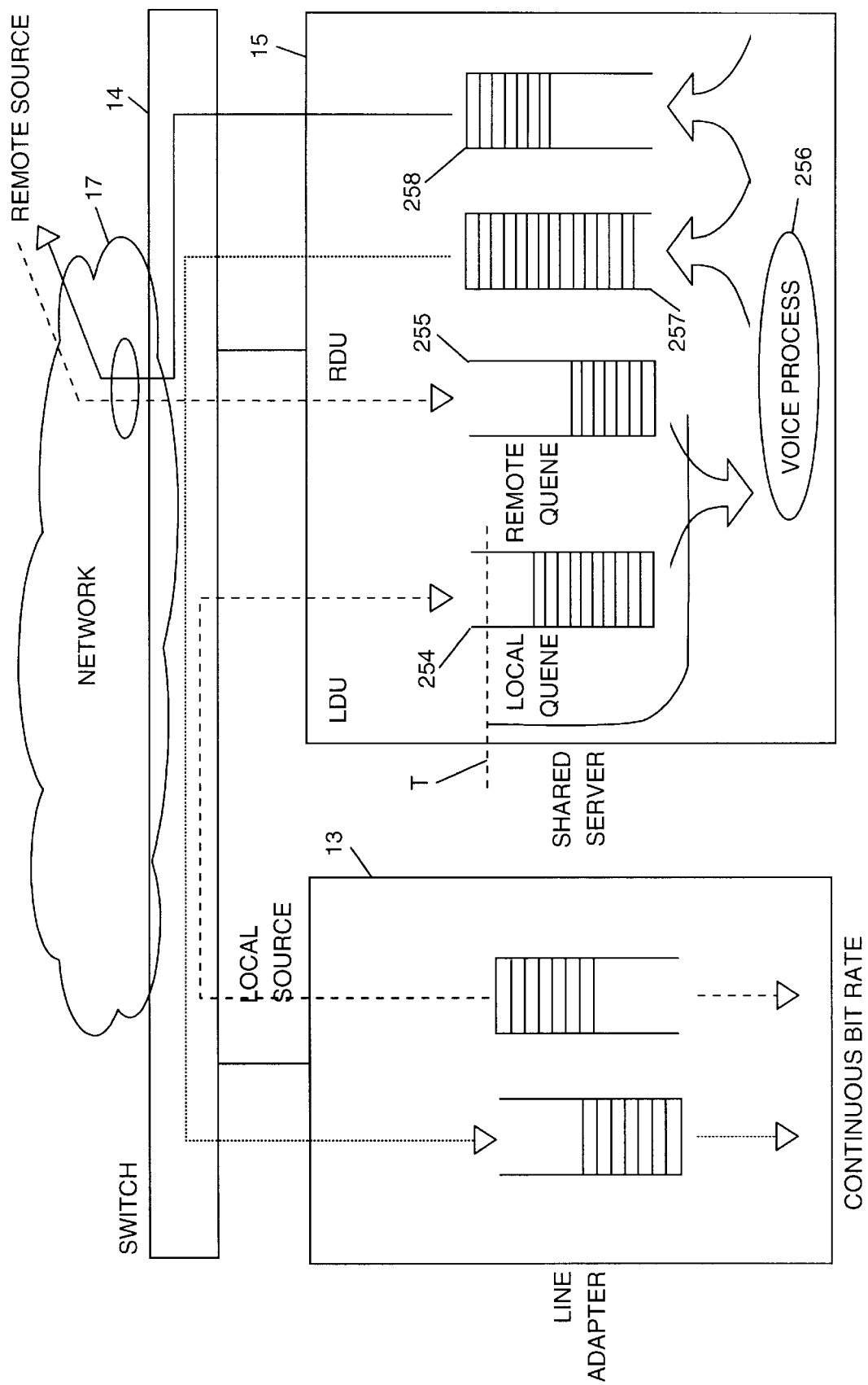
FIG. 2 shows another view of the network emphasizing the buffer structure according to the invention.

Referring now to FIG. 2, the basic elements of a connection regarding the current invention are schematically presented. From the local source a PCM signal is transmitted via the port adapter 13 and the switch 14 at a constant bit rate to the voice server 15. At the same mean rate (with some jitter), the voice server receives the GSM coded signal from the remote source of the connection over the network 17 (and the network trunk adapter 16). Both streams of digital signals are stored in respective buffers, i.e, the local (receive) queue 254 and the remote (receive) queue 255, which are administered by the RP 152 (shown in FIG. 1). Signals stored in these buffers are transmitted to the DSP for coder/decoder (CODEC) process 256. The result of this process, i.e., the PCM signal of the remote source and the GSM signal of the local source are stored in output queues 257, 258 for transmission to their respective recipients.

The PCM-GSM coding is characterized by a set of 160 PCM voice samples being coded into a 32 bytes GSM packet. With the 64 kbps constant bit rate each set of the 160 voice samples is sent in 20 ms. The decoding process generates the same amount of 160 PCM voice samples from a 32 bytes GSM packet. For the following description of this example, it is assumed that each DSP performs a CODEC operation on five voice connections. The signals being time division multiplexed to the DSP, a time slot of 4 ms is allocated per each connection every 20 ms. Disregarding the specific values, obviously this is a typical TDM problem, which is solvable by well-known methods. However, only one of the signal streams, namely the local one, arrives in a well-defined manner (constant bit rate, low jitter). The other signal stream which is the remote signal is characterized by a bit rate no more constant, a high jitter only respecting the same mean bit rate than the local input traffic, this change being introduced by the network 17. The invention solves the problems arising therefrom by following features:

At connection setup, a pair of buffers 254, 255 in the voice server 15 is assigned to this connection. One buffer 254 stores the local source traffic the other one receives the remote source traffic. In fact, there is another pair of buffers 257, 258 assigned to this connection to receive and transmit the data traffic after data coding/decoding 256, which pair however is of minor importance with respect to the current invention.

To synchronize the data stored in both buffers 254, 255 for the following TDM process (data processing 256), it is exploited that the local traffic is provided at a constant bit rate and with very low jitter: the E1/T1 lines are supporting up to 32×64 kbps channels all synchronized with the same network clock. When the local queue reaches a threshold, which is advantageously chosen to be exactly the 160 voice samples to be converted accepted as input message by the voice processor, the contents of both buffers is transmitted to the voice process.

This synchronization can be improved by using a play-out buffer (POB) 255 to store the remote queue. The POB eliminates the jitter of the remote source at the cost of a delay of the signals at the beginning of the connection. The minimum value of the delay will be the value of the expected jitter: 1×32 bytes GSM packet. Due to the granularity of one packet, the chosen delay will be of 2 packets: in the current case the delay is therefore of twice 20 ms. When receiving the read-out signal (generated after the occupation level of the local queue buffer 254 reaches the threshold T=20 ms), the first of the two packets of GSM data in the POB buffer is forwarded to the voice process.

The minimum value of the delay could correspond to more than 2 packets if the expected jitter is higher: a value P greater than 2 may be chosen in this case.

The above described synchronization process insures that at every read-out a pair of 160 voice samples and 32 bytes of GSM data of a single connection is transmitted to the voice process.

In the case where more than one connection are established the synchronization can be achieved only if the access to the conversion processor is optimally shared between connections (reduce idle times). Therefore, synchronization has not only be provided among the local and remote signals of one connection but also among the signals of a plurality of connections, i.e. five in the present example.

Figure 3A:
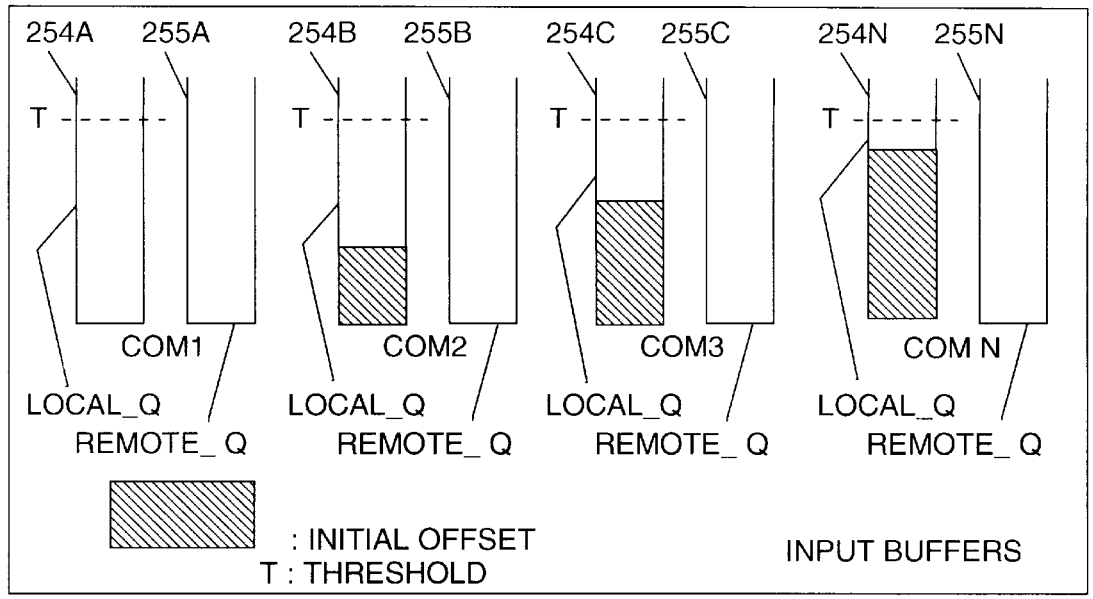
FIG. 3A shows the buffer structure for a plurality of connections.
Figure 3B:
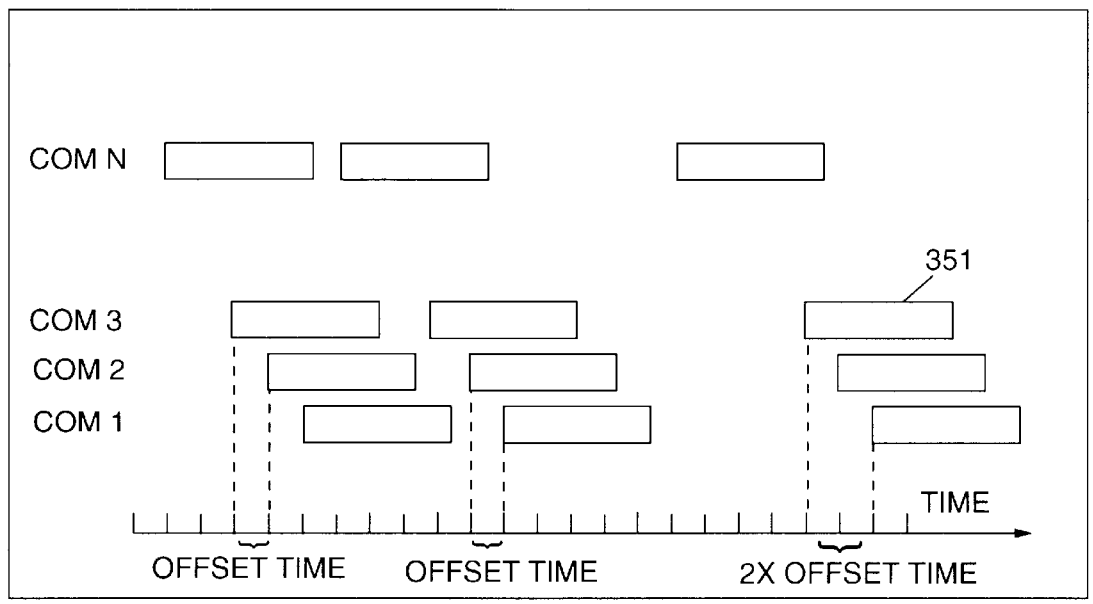
FIG. 3B illustrates the time division multiplexing performed on the signals of the connection of FIG. 3A.

The invention provides the synchronization among several connections as follows making reference to FIG. 3A and 3B: At the set-up of a second connection, the content of the local queue buffer 254B of the second connection is preloaded with a dummy data according to the formula: Current content of local queue buffer 254A (first connection) plus (modulo T) desired offset (T/M if M is the maximum possible number of connections) of the TDM process. In the present example the offset of the TDM process is ⅕ (4 ms for 5 connections).

For connection i this formula is generalized accordingly, giving:
current content of local queue buffer 254A (connection i) plus (modulo T) i−1 times (i=1, . . . , M) the desired offset (T/M) of the TDM process.

To each of the 254 A-n buffers for local traffic corresponds one paired buffer among the 255 A-n buffers for remote traffic.

In combination with the above described synchronization process applied to each of the buffer pairs 254A-n, 255A-n, it is hence assured that the signals of each connection are read-out from their respective buffers separated by exactly the introduced offset. The result of offsetting the buffers 254B-n is shown in FIG. 3B., wherein the signals packets are separated by a time interval of 4 ms in accordance with the following TDM process.

The dummy data needed in the beginning of the above described process has no significant impact on voice (or video) traffic, besides causing a little, for a human recipient merely unnoticeable noise at the beginning of the transmission. No dummy data is used thereafter.

It is required, in order to achieve the regular buffering for synchronization among the connections, the input packets (of voice samples in the case of a voice server), must be small enough regarding the maximum size of the buffer (for voice processing, 160 samples). The packetization of the local traffic is performed by the port adapter 13. For instance, a good packet size is 16 samples (16 bytes) for a voice server whose buffer size is 160 samples (160 bytes) filled up in 20 ms, the granularity of the TDM offset for a DSP supporting 5 connections being 160/5=32 bytes. If the DSP processes M connections, the granularity of input local traffic should be not greater than 160/M bytes.

Figure 4:
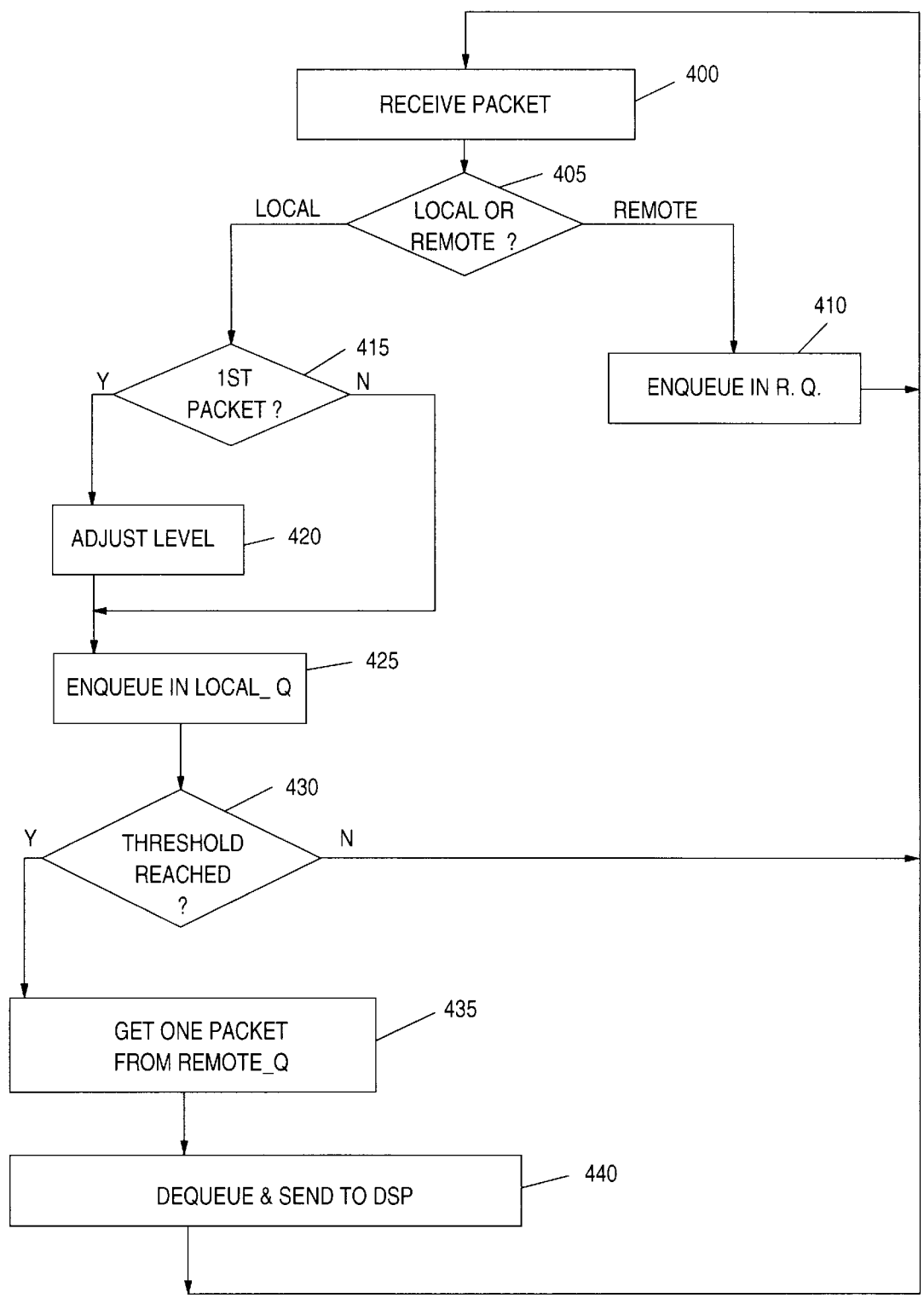
FIG. 4 is a flow chart illustrating the method of the present invention.

The FIG. 4 represents the flow chart of the method of the invention. The synchronization is provided by a period T (20 ms in the example of voice server) of data traffic buffering.

A first step 400 is for receiving an input packet coming from the input data stream. The step 405 is to test if said packet comes from local or remote traffic. If the packet comes from remote traffic, the packet is enqueued (410) in a queue for remote packets, the Remote Queue (RQ) and the reading process goes on. If the packet read comes from the local traffic, the first packet for the connection it belongs to (answer Yes to test 415), the local queue for said connection is filled up (420) with dummy data corresponding to the delay:

$$x+(T/N)\times i$$

in this expression, x is the current time of the local queue occupation level for the first connection; the +operation is the modulo T addition (T is the local queue buffering period for all the connections, T is 20 ms in the example of voice server); N is the maximum number of connections supported by the processor: 5 connections are supported by the CODEC of the example; i is the range of the connection (i=0 to N-1, i=0 to 4 in the example). The following step 425 consists in enqueueing the packet read in the local queue. The local queue buffering time is tested (430): if the threshold is not yet reached, the next packet is received (go to 400), if the threshold is reached, the packet ready from the remote queue is read (435) and sent (440) with the content of the local queue; this data is sent to the DSP for processing. It is noted that for each new connection, when the threshold is reached for the first and the second time, no packet is read from the remote queue (step 435) and then sent to the DSP simultaneously to the data from the local queue (step 440). It is only after a delay of twice 20 ms (the local queue being filled up and read twice) that the steps 435 and 440 are performed. At the end of step 440, as the local Queue is empty, the local queue buffering time is set to zero (threshold initialized). Then the next packet is received (go to step 400).

The method of the invention described in the flow chart of FIG. 4 can be implemented as a program running on a dedicated processor: the program instructions and the dedicated processor constitute a queues and buffers control unit; the local and remote queues are stored in buffers implemented in read/write memory units; an internal data bus is used to receive the input data stream, to send the output data stream towards the processor of the server and to communicate between the processor and the memory units. The internal data bus may be a Direct Access Memory bus (DMA bus) allowing simultaneous reading/writing operations.

Figure 5:
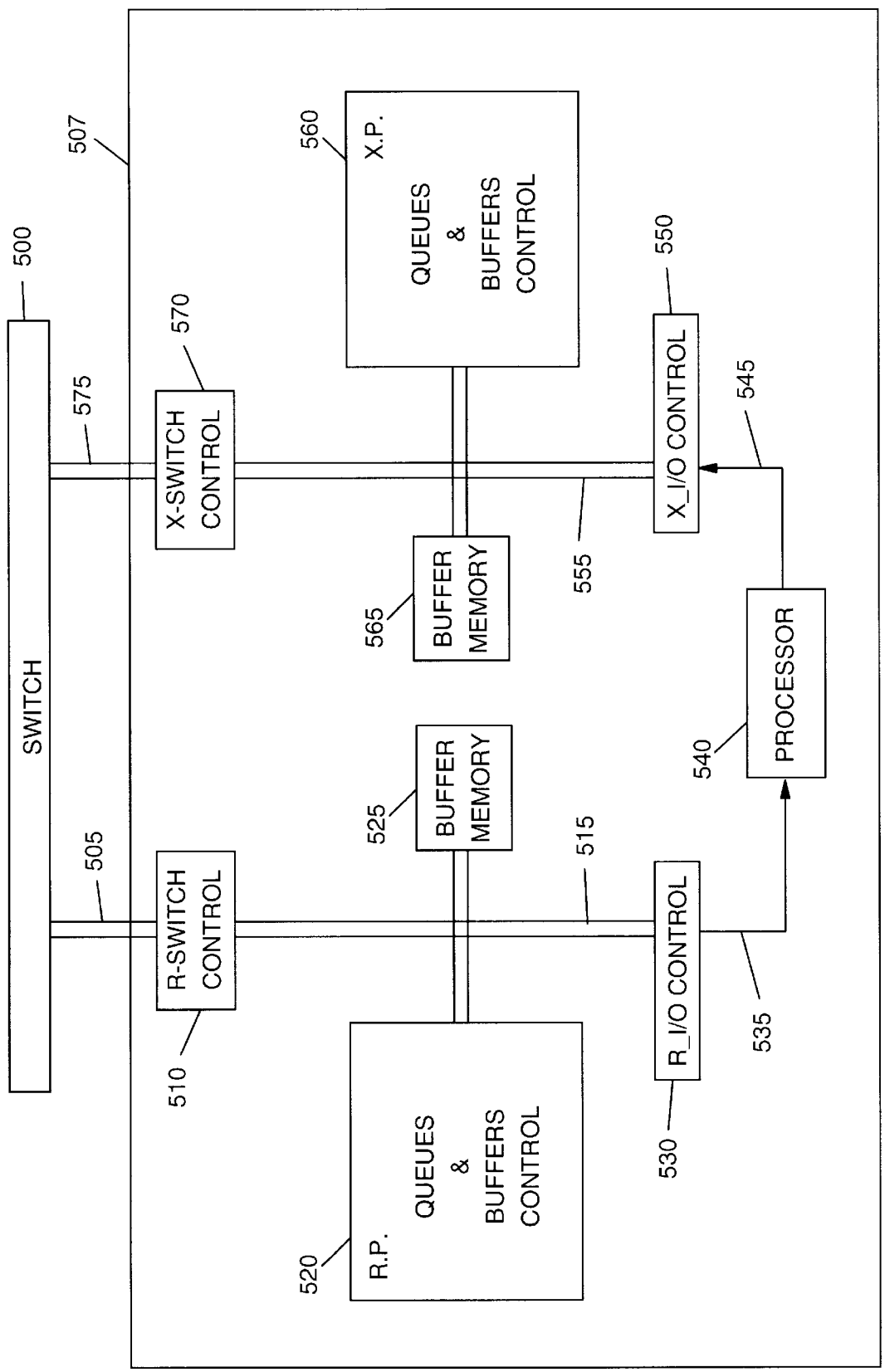
FIG. 5 shows a processing server implementing the method of the invention.

The FIG. 5 shows the voice server adapter implementing the solution of the invention. It receives from a switch (500) through a bus (505) the packetized voice samples. The packets are received by the Receive-switch controller 510 and are sent on the high performing DMA (Direct Memory Access) bus 515 to the Receive Processor (RP 520) running the program whose flow chart of the FIG. 4. The RP reads each packet and after testing provides the buffer address corresponding to its type (packet from the local or remote traffic) and sends it to the buffer memory 525 through the DMA bus 515. In parallel, the RP controls the local queues (254) in buffer 525 until the threshold T is reached. Once the threshold is reached, the RP 520 gets one packet (the last entered) from the remote queue (255) of buffer 525 and the 160 packetized voice samples of the local queue (254) and sends the data towards the DSP through the DMA bus 515. The receive I/O controller 530 intercepts the data sent by the RP for adapting it to the format of the bus 535 accepted as input by DSP processor 540. The receive I/O controller 530 sends the data to the processor DSP 540 for voice processing. The DSP processor 540 reads the input data and performs the processing (coding/decoding PCM-GSM/GSM-PCM), the 160 voice samples from the local queue being coded into one 32 bytes GSM message and the 32 bytes message of the remote queue being decoded into 160 voice samples). The DSP 540 sends the coded data through the bus 545 to the transmit I/O controller 550 in charge of interfacing the DMA bus 555. The I/O controller sends the coded data on the bus 555 towards the transmit processor XP 560. The XP 560 receives the data and depending on the data coming from the local or remote traffic, sends it for storage in the buffer memory 565 through the bus 555 appending either one address in the output queue (257, 258) for local or for remote traffic. In parallel, the XP goes on receiving coded data and filling up the output queues to the Transmit-switch controller 570 while the ready data of the output queues still goes through the 555 bus in usual way for output queues in asynchronous mode. The Transmit-switch controller 570 interfaces the bus 575 going to the switch 500 and sends the data on it.

What is claimed is:

1. In a data packet communication system having at least one full duplex connection a method for synchronizing the data packets received from a local data source engaged in a full duplex connection with the data packets received from a remote source engaged in the same full duplex connection comprising the steps:

assigning a pair of buffers to a full duplex connection upon establishment of the full duplex connection buffering the data packets received from the local data source engaged in the full duplex connection in the first buffer of the pair of buffers;

buffering the data packets received from the remote data source in the second buffer of the pair;

monitoring the number of packets stored in the first buffer; and transferring the contents of the first buffer to a digital processor when the number of stored packets reaches a predetermined value T and at the same time transferring the oldest data packet in the second buffer to the digital processor for simultaneous processing.

2. The method set forth in claim 1 including the following steps:

immediately following initialization of a full duplex connection, transferring only the packets in the first buffer to the digital processor a preselected number of times N to compensate for excessive jitter in the data packets from the remote data source.

3. The method set forth in claim 2 in which the magnitude of the preselected number N is increased to compensate for increased jitter in the data packets received from the remote source.

4. The method set forth in claim 3 including the following steps:

for each full duplex connection 2 through m, where m is the maximum number of full duplex connections supported, established following the establishment of the first full duplex connection, loading in each said first buffer associated with a full duplex connection, a dummy data portion which is equal to a predetermined value times i-1 where i is the order in which a full duplex connection is established.

5. The method set forth in claim 4 in which the size of the packets received from the local source is equal to or less than the size of the first buffer divided by the maximum number of full duplex connections m supported by the processor.

6. In a data packet communication network having at least one full duplex connection serving a local data source and a remote data source, apparatus connected to the network for synchronizing the data packets received from the local data source engaged in a full duplex connection with the data packets received from the remote source engaged in the same full duplex connection comprising:

first means for receiving and storing data packets from the local data source in a first buffer of a pair of buffers assigned to the established full duplex connection;

second means for receiving and storing data packets from the remote data source in a second buffer of said pair of buffers assigned to the established full duplex connection;

third means for monitoring the number of packets stored in the first buffer; and, fourth means for transferring the contents of the first buffer to a digital processor when the number of stored packets reaches a predetermined value T and at the same time transferring the oldest data packet in the second buffer to the digital processor for simultaneous processing with the data packets transferred from the first buffer of the pair of buffers.

7. The apparatus set forth in claim 6 in which said fourth means includes:

fifth means for transferring only the packets in the first buffer to the digital processor a preselected number of times N immediately following initialization of a full duplex connection to compensate for excessive jitter in the data packets from the remote data source.

8. The apparatus set forth in claim 7 in which the magnitude of the preselected number N is increased to compensate for increased jitter in the data packets received from the remote source.

9. The apparatus set forth in claim 7 in which for each full duplex connection 2 through m, where m is the maximum number of full duplex connections supported, following the establishment of the first full duplex connection:

the first means receives and stores data packets from the local source in a first buffer of a pair of buffers assigned to that full duplex connection;

the second means receives and stores data packets from the remote source in a second buffer of the pair of buffers assigned to that full duplex connection; and sixth means for loading, upon initiation of a full duplex connection, in the first buffer of the pair of buffers assigned to the full duplex connection, a dummy data portion which is equal to a predetermined value times i-1 where i is the order in which the full duplex connection is established.

* * * * *